Patented Jan. 30, 1940

2,188,636

UNITED STATES PATENT OFFICE 2,188,636

PLATINUM ALLOY FOR CONTACTING MOLTEN GLASS

Michel B. Vilensky, Newark, Ohio, assignor to Owens-Illinois Glass Company, a corporation of Ohio No Drawing. Application August 24, 1938, Serial No. 226,580

4 Claims. (Cl. 75—172)

The present invention relates to platinum alloy compositions particularly designed for use in glass working apparatus. The alloy finds particular use in feeder outlets such as illustrated and described in the British Patents No. 428,720, No. 482,532, or No. 482,085. The French Patent No. 815,503 illustrates more particularly a bushing suitable for use in the production of fibrous glass. The invention also finds use in various forms of glass handling equipment such, for example, as illustrated in U. S. patent to Weller No. 2,031,083.

Heretofore, in the aforementioned art various two-component alloys have been mentioned, the most common of which has been a platinum rhodium alloy. Among the objections of such an alloy are the high cost of the rhodium, especially since about 10% is generally required, and the fact that as the alloy is heated and occasionally reworked, a portion of the rhodium gradually volatilizes.

One of the objects of the present invention is to overcome the foregoing difficulties and produce an alloy suitable for glass working or similar types of apparatus.

Another object of the present invention is to provide an alloy which may utilize base metals in their composition in order to impart the desired physical and chemical properties and at the same time lessen the cost of the material.

Another object of the invention is to produce an alloy which has hardness coupled with ductility suitable for working into desired form of exact dimensions as required in glass feeders, especially for fibrous glass.

Another object is to provide such an alloy which is stable up to high temperatures and permits the melting and handling of glasses having melting points up to at least 2800° F.

Another object is to provide an alloy which is stable to chemical actions of any kind with molten soda-lime-silicate, or borosilicate glasses, or other types of glasses commonly used which are free, however, from ingredients which attack platinum at the melting temperatures of any of the commonly known glasses.

It is another object to produce an alloy which will withstand physical action and abrasion of any common types of glass flowing over the surface thereof.

A characteristic feature of the novel alloy herein disclosed is that it is capable of being given a very smooth surface, thereby reducing to a minimum the friction of the molten glass flowing thereover.

Still another object of the invention is to provide an alloy of the character indicated which will retain its chemical and physical properties after it has been reworked, remelted and rerolled.

Various other objects and advantages of the present invention will become apparent from the following description.

In order to achieve the objects of the invention, I use a three-component platinum alloy having the principal ingredients consisting of platinum, iridium and nickel. The portions of the ingredients may be varied within suitable limits ranging as follows:

|  | Percent |
|---|---|
| Platinum | 90 to 98 |
| Iridium | 1.5 to 8 |
| Nickel | .3 to 2 |

Both the iridium and the nickel seem to co-operate to harden the alloy. The combination enables a small amount of each to be successfully used. The iridium raises the melting point of the alloy although the nickel slightly lowers the same while imparting increased hardness. Excessive amounts of nickel are to be avoided since they permit an oxidation scale to be formed on the surface of the alloy which is detrimental.

If especially high temperature resistance is required, the iridium may be added in the larger amounts specified although I have found that for ordinary glass working alloys, only a small amount of the iridium and nickel are required. An alloy of 98% platinum, 1.5% iridium and .5% nickel is highly satisfactory, since it entails a minimum of cost, and possesses adequate properties of hardness, ductility, wear resistance and chemical durability.

The alloy within the present invention is easy to form and may be readily worked cold, and yet the alloy is hard enough to hold its shape and allow for reworking. In operation the alloy does not have any appreciable volatilization loss as the nickel counteracts the normal action of the iridium in this respect. The oxidation of the nickel is especially low due to the very small percentage present.

Among the other properties of my three-component platinum alloy are:

1. That it is stable and may be used with molten glasses in contact therewith at temperatures up to and above 2800° F.;

2. The alloy is stable to chemical actions of any kind with molten soda-lime-silicate or borosilicate glasses or the like;

3. The alloy has high stability to chemical and mechanical actions of molten glass in contact therewith when continuously heated at the melting temperatures of the glass;

4. It may be rolled cold to any desired thickness and give a high polish to minimize friction, and while cold may be given any desired shape without any mechanical injury.

5. It does not oxidize appreciably when continuously electrically heated and maintained at high temperatures in contact with molten glass; and 6. The alloy may be reworked, remelted and rerolled without changing its chemical and physical properties.

Modifications and variations may be resorted to within the spirit and scope of the invention as defined in the appended claims.

I claim:

1. An alloy comprising 90% to 98% platinum, 1.5% to 8% iridium and .3% to 2% nickel.

2. A metallic feeder for molten glass having an orifice outlet through which said glass flows in direct contact with said feeder, said feeder composed of an alloy comprising 90% to 98% platinum, 1.5% to 8% iridium, and .3% to 2% nickel.

3. A metallic feeder for glass having an orifice outlet through which said glass flows in direct contact with said feeder, said feeder composed of an alloy comprising 98% platinum, 1.5% iridium and .5% nickel.

4. In the handling of molten glass, an element in direct contact with said molten glass, said element formed of a three-component alloy comprising platinum, iridium and nickel, wherein the platinum constitutes 90% to 95%, iridium 1.5% to 6%, and nickel .3% to 2%.

MICHEL B. VILENSKY.